UNITED STATES PATENT OFFICE.

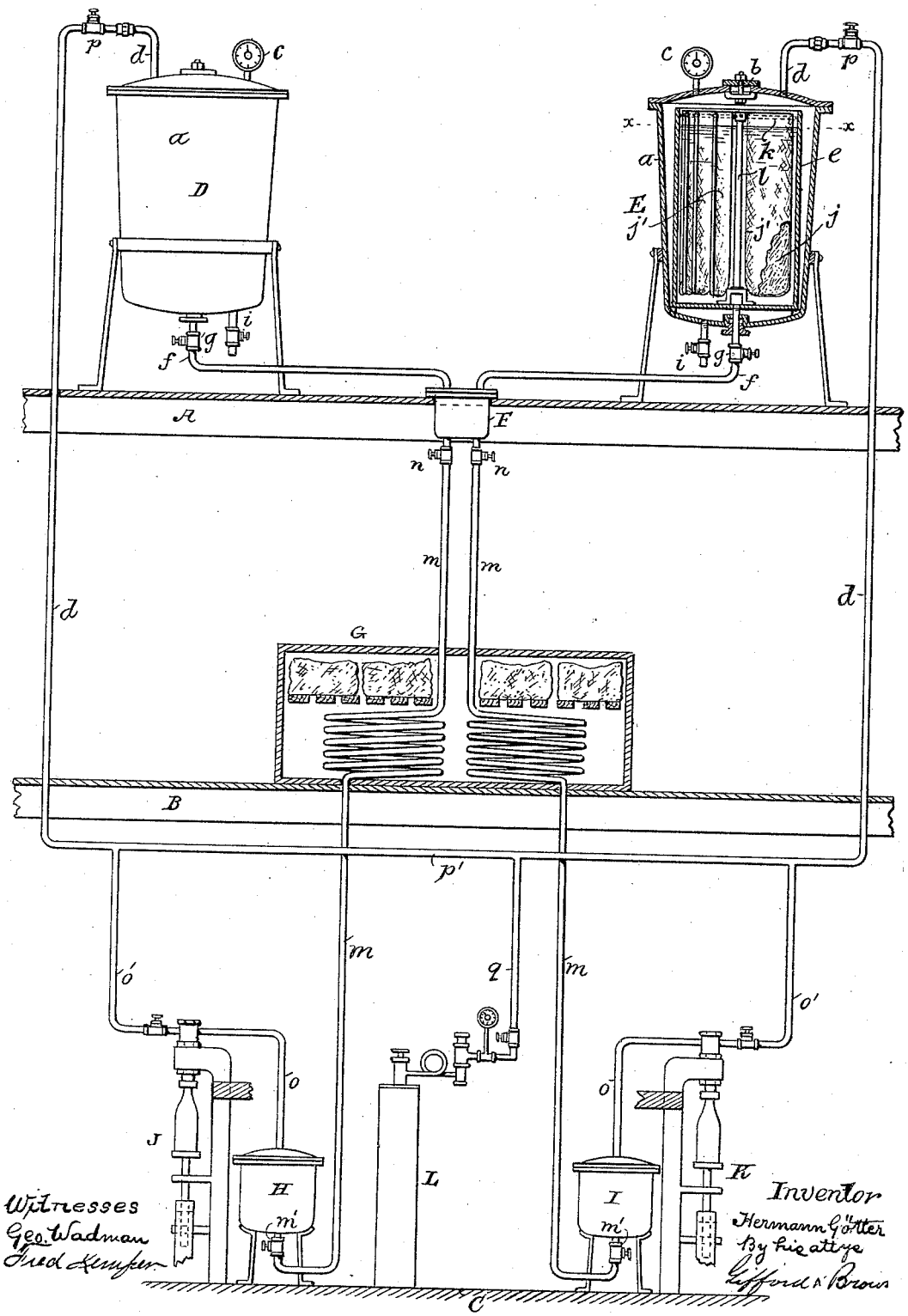

HERMANN GÖTTER, OF JERSEY CITY, NEW JERSEY, ASSIGNOR TO THE INTERNATIONAL WINE COMPANY, OF NEW JERSEY.

APPARATUS FOR THE MANUFACTURE OF FERMENTED LIQUIDS.

SPECIFICATION forming part of Letters Patent No. 443,190, dated December 23, 1890.

Application filed April 11, 1890. Serial No. 347,507. (No model.)

*To all whom it may concern:*

Be it known that I, HERMANN GÖTTER, a subject of the Emperor of Germany, residing in Jersey City, New Jersey, have invented certain new and useful Improvements in Apparatus for the Manufacture of Fermented Liquids, of which the following is a specification.

Heretofore the fermentation of wine has been accomplished in bottles and in vats, requiring a long time for its accomplishment. It has been proposed to hasten or facilitate the operation by introducing into the wine paper-pulp, cotton, hemp, chopped hay, and grape-skins; but the process as so conducted has thus far proved unsatisfactory, because the presence of the substances named has been found to produce chemical changes affecting injuriously the flavor and bouquet of the wine.

I have discovered a means by which the fermentation of even a sparkling wine may be accomplished in five or six days without impairing the qualities of the wine. This discovery consists of the fact that the presence in the wine undergoing fermentation of a substance presenting to the wine a great area of contact will hasten the fermentation, although the composition of the substance be such that it is substantially inert in the surroundings and conditions to which it is submitted, and therefore sets up no changes which are injurious to the qualities of the wine in flavor and bouquet. This discovery having been once made, it is evident that it may be utilized by means of a wide range of substances, all of them possessing properties equivalent to those which I am about to name, and I therefore do not desire to be understood as limiting myself to any particular example of the class. I have utilized my discovery by means of the immersion into the wine of spun glass, which, by reason of its fibrous or porous nature, affords a great surface contact to the wine and at the same time is lacking in those properties which set up other changes in addition to fermentation, and in this sense may be said to be substantially inert. I have furthermore discovered that the same substance may be used over and over again in the fermentation of successive batches of liquid, and that up to a certain point its efficiency will increase; but that beyond such point, which may be detected by the substance emitting a disagreeable odor, the use of the same substance will impair or injure the quality of the wine unless it be cleansed, when its efficiency will be continued. I have also discovered that the substance which is immersed in the wine to accomplish the best results should be distributed to all parts of the vat containing the wine.

I will now describe the invention and the apparatus by which it may be practiced, and which is illustrated in the accompanying drawing.

In the apparatus shown the vats are hermetically closed, so as to be adapted for the fermentation of sparkling wine.

A, B, and C represent three different floors, upon which different parts of the apparatus may be located, though this arrangement is not essential; but it is generally preferred for economy of room and facility of increasing the capacity of the apparatus at any time desired.

D and E are vessels within which the fermentation may be accomplished, one shown in side view and the other in section. They are similar in construction, and may be multiplied to any extent if it be desired to increase the capacity of the apparatus.

F is a receiver by which the fermented wine from the various fermenting-vessels is received and distributed to the extent required to the various bottling-machines. This receiver may also serve to receive some of the spun glass, so that, if desired, the wine from the fermenting-vessels may be further brought into contact with the spun glass before being distributed to the refrigerator and filters.

G is the refrigerator by which the fermented wine is cooled to make it retain a larger proportion of gas.

H and I are filters for the clarification of the wine before it is bottled.

J and K are the bottling-machines.

L is a carbonic-acid-gas machine.

A description of one of the fermenting-vessels will suffice for all.

*a* is a metallic shell capable of standing an internal pressure of, say, at least one hundred and twenty pounds to the square inch. The top is made removable, and is removed for the purpose of cleansing and for inserting and removing the spun glass. This vessel is provided with a hand-hole $b$, which is preferably located at the center of the top. It is also provided with a pressure-gage $c$. It is also provided at its top with a pipe $d$, connected with the various bottling-machines. Within the vessel $a$ is placed an open vat $e$, constructed of some material—as, for instance, white wood or silver—which will not corrode or in any way injuriously affect the aroma or flavor of the contained wine. From the bottom of this vat a pipe $f$ extends downward through the bottom of the vessel $a$. A packing is provided where this pipe passes through the vessel $a$ to maintain the required pressure within that vessel, and the portion of the pipe $f$ which is exposed to the wine is constructed of such material as not to corrode or impair the same.

$g$ is a valve in the pipe $f$, which remains closed until the process of fermentation is completed.

Another outlet, as at $i$, with a suitable valve, may be supplied, if desired, for use when the vat is being washed out with water.

The fermenting-vessel E is illustrated as containing spun glass $j$ as the material immersed in the wine while undergoing fermentation. In order that this spun glass shall be distributed in all parts of the vat, it is placed in bags $j'$ of suitable material, which are suspended from the rods $k$, radiating from a central standard $l$. Obviously this supporting mechanism may be varied—for instance, silver wire may be used—the object in view being to distribute the substance, whatever it may be, in various parts of the vat.

The pipes $f$ leading from the various fermenting-vessels all connect with the receiver F. This receiver consists simply of a vessel so constructed as to withstand sufficient internal pressure, and from the bottom of which lead various pipes $m$, sufficient in number to correspond with the number of bottling-machines.

$n$ are valves, located one in each of these pipes where it leaves the receiver.

The refrigerator may be of any convenient form for cooling the contents of pipes $m$ by any of the well-known cooling mediums—such as ice, cold water, or expanded gases—to a temperature of 40° Fahrenheit, or thereabout. In the drawing ice is shown as being placed above the coils formed in the various pipes. From the refrigerator the pipes $m$ pass to the bottoms of the respective filters, and each pipe is provided with a valve $m'$ just below the filter. The filters are of any of the well-known constructions in which the wine is compelled to pass through substances calculated to clarify it without imparting any disagreeable qualities. From the top of each filter a pipe $o$ leads to the bottling-machine. The bottling-machine is of the ordinary construction employed for bottling sparkling beverages, and from each bottling-machine a pipe $o'$ connects with the pipe $d$, so as to lead the carbonic-acid gas (with which the bottle is charged before being filled with wine, and which passes out of the bottle as the wine enters) back into the fermenting-vessel, where this carbonic-acid gas occupies the space which was left vacant in the fermenting-vessel by the removal therefrom of the wine necessary to fill the bottle. A valve $p$ is provided in each pipe $d$ adjacent to each fermenting-vessel, which valve will be closed excepting when the fermenting-vessel is being discharged, so that the carbonic-acid gas from all the bottles being filled will be returned to the fermenting-vessel which is being discharged.

The carbonic-acid-gas-generating machine L is connected by pipe $q$ with pipe $p'$, so as to insure the maintenance of the proper pressure of gas in the pipes connected with the fermenting-vessels to facilitate the exclusion of air.

The operation is as follows: The pipes, receiver, and filters leading from the fermenting-vessels are filled with water to exclude the air. The spun glass is arranged within the various vats, as described, and the covers put in place, the hand-holes are opened and the vats are filled with wine which is already in process of fermentation (to which a trifle of sugar is added) up to about the level indicated in the vessel E by the line $x$. Above this line the vessel is filled with carbonic-acid gas, so that no air is left in contact with the wine. The hand-hole is then closed and the temperature of the room maintained at from 70° to 80° Fahrenheit, or thereabout, and as nearly uniform as practicable. Under these conditions the pressure-gage will indicate a rise of pressure, and when it indicates a pressure of from seventy-five to ninety pounds per square inch, or thereabout, the fermentation may be considered complete. This may occupy from five to six days, or thereabout. Then the valves $g$ and $p$ are opened, and as many of the valves $n$ as it is desired to employ of the bottling-machines. The wine, driving the water before it, which may be discharged through the pipe leading to the bottles before the bottles are placed in position, will flow through the receiver, the refrigerator, and the filter successively and into the bottles, where it replaces the carbonic-acid gas with which the bottles have been previously charged, as usual, which passes upward through the pipe $d$ into the fermenting-vessel. After the contents of one fermenting-vessel have been discharged the valves $p$ and $g$ may be closed and it may be recharged, and while the fermentation is proceeding in it other fermenting-vessels connected with the same separator may be discharged. In this manner the operation of bottling may be conducted continuously, the charging of the various fermenting-vessels being so timed as to cause some one of them always to be in condition to be discharged. After the fermenting-vessel has been discharged and before a new charge of wine is inserted I rinse out the vat, and in doing so rinse the spun glass or other substance contained within the vat. This I do by filling the vat with water through the hand-hole and agitating the spun glass therein sufficiently to rinse the same and cause sediment formed in the vat to run off with the contained water through the pipe $i$, to effect which the water carrying the sediment may overflow from the vat into the outer vessel and then out through the pipe $i$.

The spun glass when new will not be as efficient as after it has been used, and the rinsing of it between the successive operations is not sufficient to impair this increased efficiency. After the process has been conducted over and over a great number of times in this manner the spun glass may, however, become somewhat foul, as can be detected by the odor which it will emit under such circumstances. When this is discovered, I remove the cover of the fermenting-vessel and also the spun glass and wash the interior of the vat and replace the old spun glass by new, or by the old spun glass cleansed by washing and heating, and then proceed with the process as before.

In making up the first batch with new spun glass or equivalent substance I have directed wine to be used already in process of fermentation. This, although not absolutely essential, will be found expedient to secure economical working on a large scale. In making up subsequent batches with the same spun glass or substance it is best to also use wine already in process of fermentation, though not so essential as with the first batch.

I do not desire in the claims to limit myself to exact details, as I believe my invention to be broader than mere details.

In applying the word "inert" to the spun glass or equivalent substance I do not wish to be understood as asserting that a scientist might not discover some action unknown to me. I use that term to indicate that it is productive of no action which substantially impairs the qualities of the wine.

By employing an inorganic substance substantially inert toward the beverage in the fermenting-vessel the fermentation is greatly accelerated and without said substance imparting any disagreeable and deleterious taste, flavor, or odor to the beverage, which injurious effects practice has demonstrated follow the use of cotton, wood, and other vegetable substances. By the use, however, of inorganic substances such objectionable results are obviated and the process of fermentation materially hastened and improved.

It will be observed that the spun glass is suspended bodily within the vat $e$, so that the wine can circulate under and about the same, and thus be brought into contact with a greater area of surface than otherwise and its fermentation to that extent facilitated and expedited and much better results obtained than would be if the inorganic matter were allowed to rest on the bottom of the vat and a comparatively solid or concrete mass thus formed.

I claim—

1. In an apparatus for fermenting beverages, a closed vessel provided with an inlet and exit for wine and containing spun glass, with which wine may be brought into contact to produce fermentation, substantially as and for the purposes set forth.

2. In an apparatus for fermenting beverages, a closed vessel provided with an inlet and an exit for wine, an inorganic substance substantially inert toward the wine, suspended bodily within said vessel from the upper portion thereof, to permit the wine to pass about and beneath said substance, and means for so suspending said inorganic substance, substantially as described.

3. In an apparatus for fermenting beverages, the combination of a series of fermenting-vessels, a series of filters, a bottling-machine, a receiver located intermediate of the fermenting-vessels and filters, pipes leading from all the fermenting-vessels to said receiver, and separate pipes leading from the receiver to the filters, substantially as and for the purposes described.

4. In an apparatus for fermenting beverages, the combination of a series of fermenting-vessels, a refrigerator, a receiver common to all of said fermenting-vessels, pipes leading from all the fermenting-vessels to said receiver, separate pipes leading from said common receiver through said refrigerator and to separate filters, the filters with which said pipes connect, and a bottling-machine connected by pipes to said filters, substantially as described.

5. In an apparatus for producing sparkling wine, the combination of a closed fermenting-vessel, a porous or fibrous inorganic substance substantially inert toward the wine and suspended bodily within said vessel, means for so suspending said substance, a refrigerator to which the beverage is conducted from said vessel, a filter connected with said refrigerator, and a bottling-machine connected with said filter, substantially as described.

HERMANN GÖTTER.

Witnesses:
HARRY D. BUSH,
S. O. EDMONDS.